United States Patent [19]

Day, III et al.

[11] Patent Number: 5,537,578
[45] Date of Patent: Jul. 16, 1996

[54] TRANSPARENT DRIVING PARTITION FOR PROCESSING LOGICAL VOLUMES TO BE RECORDED ONTO OPTICAL MEDIA

[75] Inventors: Kenneth F. Day, III; Douglas W. Dewey, both of Tuscon, Ariz.; Michael A. Truty, Waterbury, Conn.

[73] Assignee: International Business Machines Corporation, Armonk, N.Y.

[21] Appl. No.: 49,470

[22] Filed: Apr. 20, 1993

[51] Int. Cl.$^6$ .................................................. G06F 13/10
[52] U.S. Cl. .................................... 395/492; 364/DIG. 1; 364/249.4; 364/249.6; 395/439
[58] Field of Search ............................ 395/425, 575, 395/438, 439

[56] References Cited

U.S. PATENT DOCUMENTS

| | | | |
|---|---|---|---|
| 4,545,044 | 10/1985 | Satoh et al. | 369/32 |
| 4,760,566 | 7/1988 | Kobayashi et al. | 369/48 |
| 4,788,672 | 11/1988 | Toyooka et al. | 369/32 |
| 4,939,598 | 7/1990 | Kulakowski et al. | 360/48 |
| 4,953,122 | 7/1990 | Williams | 364/900 |
| 4,984,103 | 1/1991 | Nigam | 360/74.1 |
| 5,062,009 | 10/1991 | Yamagata et al. | 360/33.1 |
| 5,210,866 | 5/1993 | Milligan et al. | 395/575 |
| 5,287,459 | 2/1994 | Gniewak | 395/575 |

FOREIGN PATENT DOCUMENTS

| | | | |
|---|---|---|---|
| 3098889 | 4/1988 | Japan | G11B 27/00 |
| 0416968A3 | 3/1991 | Netherlands | G11B 20/18 |
| 0328240A3 | 8/1989 | United Kingdom | G11B 20/12 |
| 0508755A3 | 10/1992 | United Kingdom | G06F 3/06 |
| WO9222865 | 12/1992 | WIPO | G06F 11/16 |

OTHER PUBLICATIONS

B. R. Howarth, "Review of Disk Scheduling Policies", Nov. 1982, The Australian Computer Journal, V14 N4, pp. 150–154.

IBM Technical Disclosure Bulletin, "Handling Data Integrity Exposures When Updating Erasable Optical Media", vol. 34, No. 5, Oct. 1991, pp. 151–152.

IBM Technical Disclosure Bulletin, "File Access Staging Facility for Computer Systems", vol. 35, No. 1A, Jun. 1992, pp. 7–9.

Computer Society Internal Conference (COMPCON), Digest of Papers, "A Survey of Very Large Capacity On–Line File Systems Using Optical Disks", by Y. Kinouchi, et al., vol. 32, Feb. 23, 1987, pp. 142–145.

"Error Recovery for Magneto–Optical Disks", Jan., 1990, IBM Tech. Discl. Bulletin, vol. 32, No. 8B, pp. 411–414.

"Shared Memory Management for Transaction Speed–Up . . .," Mar., 1986 IBM Tech. Discl. Bulletin, vol. 28, No. 10, pp. 4520–4535.

*Primary Examiner*—Eddie P. Chan
*Assistant Examiner*—Kevin L. Ellis
*Attorney, Agent, or Firm*—D. A. Shifrin

[57] ABSTRACT

A system for recording on a rewritable (erasable) optical disk is provided which reduces the data integrity exposure and negative performance impact of separate erase and write passes when writing data to such a disk in a disk drive. In a preferred embodiment, the system includes a non-volatile storage buffer established and maintained by a driver at a level below the file system. Space in the buffer is kept pre-erased for temporarily storing blocks of data transmitted by a host device and destined for sectors in a logical partition on a rewritable optical disk. Mapping and control information are also maintained in the buffer. In a background operation, transparent to the host, the blocks of data are copied from the buffer to their destination sectors in the logical partition. The buffer can be located on the optical disk itself or can be on a separate device, such as non-volatile random access memory or magnetic media. The present invention eliminates data exposure between the erase and write passes of a typical two- or three-pass write operation while enhancing performance by eliminating the erase pass immediately before a write.

12 Claims, 4 Drawing Sheets

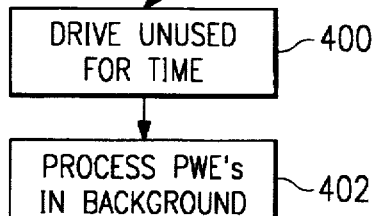
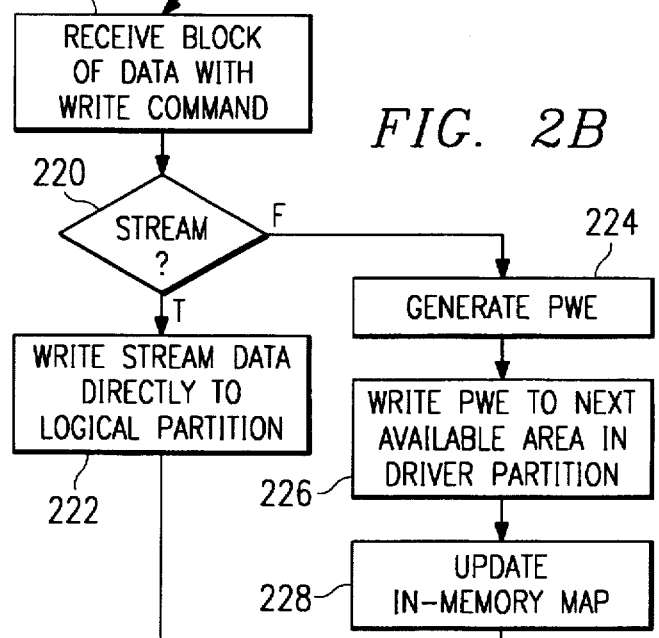
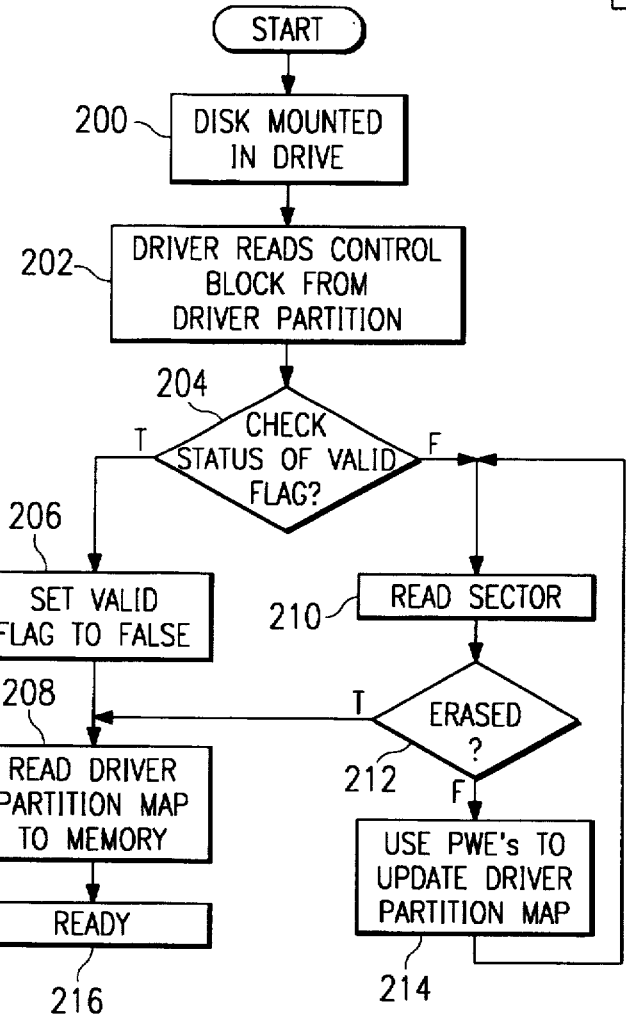
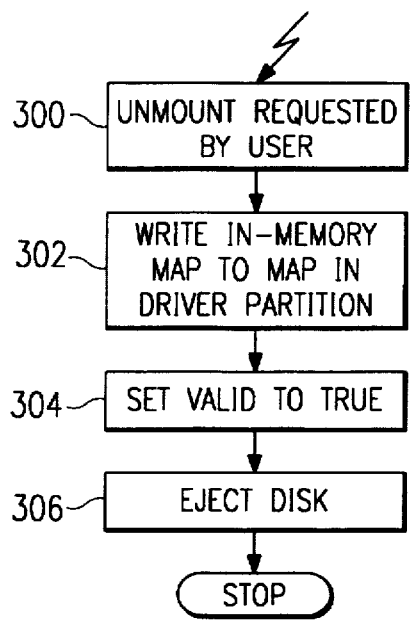

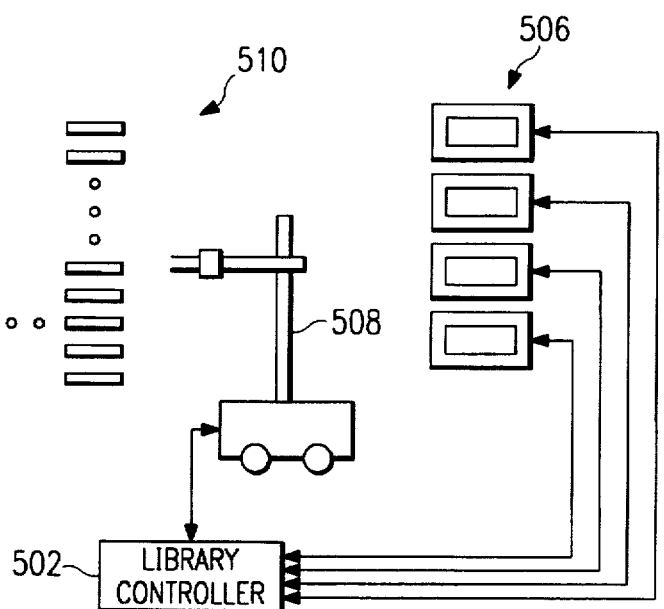
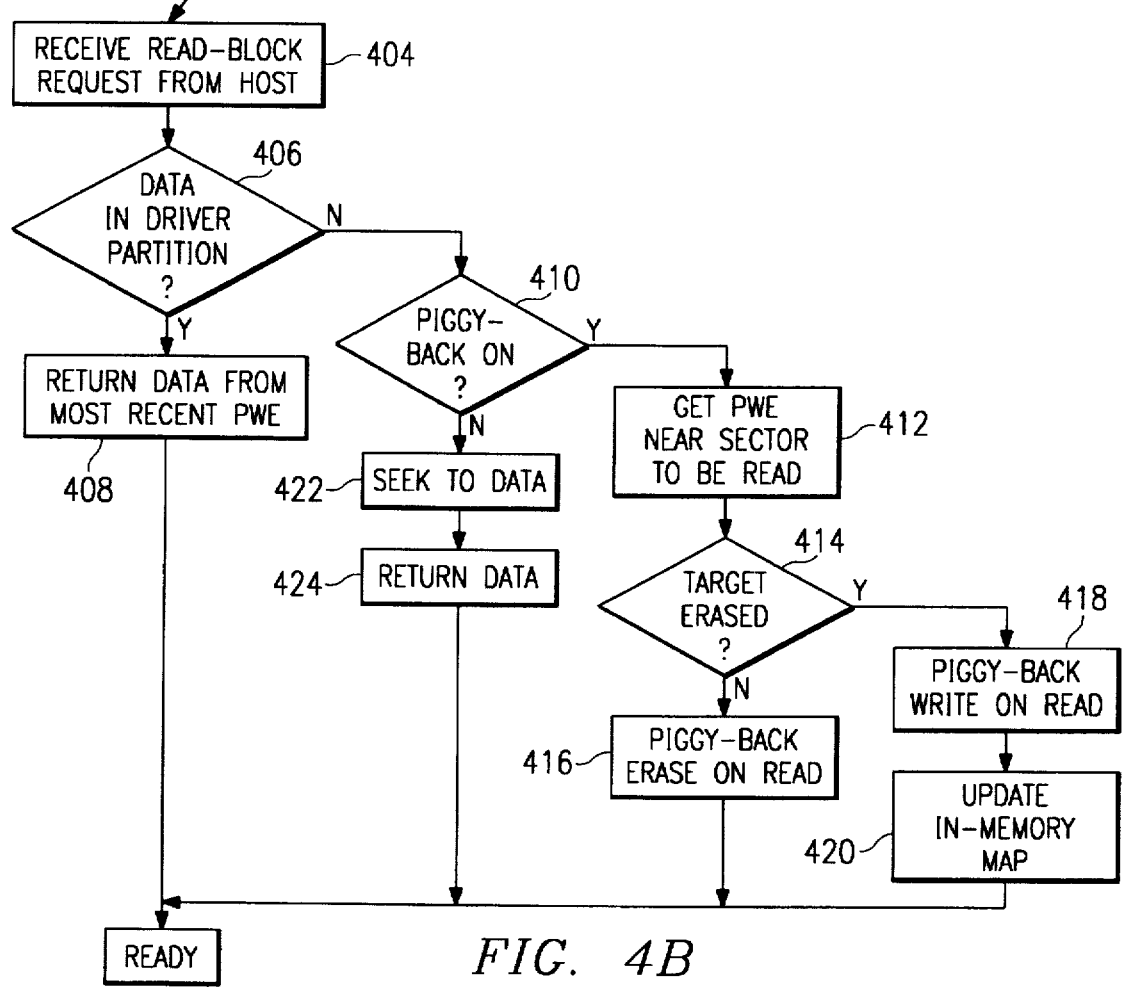
*FIG. 5*
*FIG. 4B*

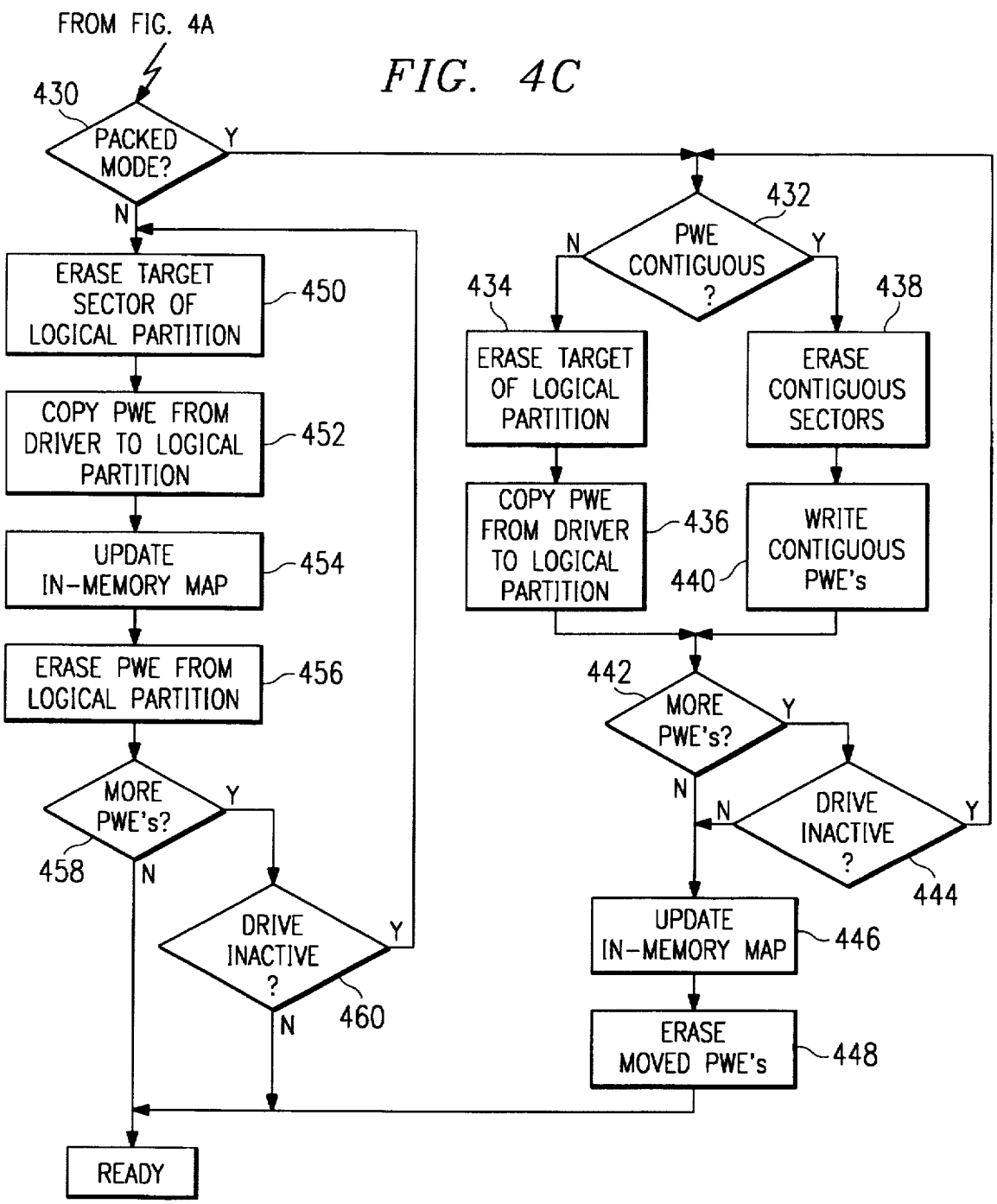

TRANSPARENT DRIVING PARTITION FOR PROCESSING LOGICAL VOLUMES TO BE RECORDED ONTO OPTICAL MEDIA

TECHNICAL FIELD OF THE INVENTION

The present invention relates to rewritable (erasable) optical disks and, in particular, to a method and apparatus for reducing the data integrity exposure and negative performance impact of separate erase and write passes when writing data to such a disk.

BACKGROUND OF THE INVENTION

The recording surface of optical disks, like the recording surface of magnetic disks, is divided into a series of data recording tracks (concentric or spiral) having a common rotational center. Each track is subdivided into sectors; data is typically written to and read from a disk in logical blocks. Hereinafter, the term "block" will refer to the data and the term "sector" will refer to a physical location on a disk to which a single block of data can be written. Data can include directories, volume table of contents and control structures, as well as user or file data (collectively referred to herein as file system data) and maintained by file system software. The logical block structures used by the present invention, however, are implemented and maintained by driver software at a system level below the file system software (through which the user interacts with the system).

Using known processes, certain optical media, such as magneto-optical (MO) and phase change disks, are rewritable but currently require that data previously recorded onto a particular sector of the disk be erased before a new or revised block of data is recorded on that sector. Therefore, writing new or revised data onto a sector of such a disk requires a first rotation or pass of the disk while the sector (containing obsolete data) is erased and a second rotation while the data is written. Verification is generally desired and may require a third rotation.

A significant disadvantage of the erase-before-write procedure is that the integrity of revised data to be written to the disk is jeopardized between the erase pass and the write pass. If, for example, power is lost or the system fails during this time, the data to be written will be lost from the memory of the processor or drive controller, but the original version of the data, just erased from the disk, will also be lost thereby impeding recovery.

The erase-before-write procedure presents an additional disadvantage. In addition to the time delays imposed by the erase, write and verify passes themselves, delays are also incurred while the optical head moves radially inwardly or outwardly seeking the desired track for the erase pass (seek delay) and while the head waits for the desired sector on the track to rotate into position opposite the head for the erase, write and verify operations (latency delay). The three-pass erase-write-verify procedure is typically performed separately for each block of data to be written (or group of blocks destined for contiguous sectors) and seek and latency delays can cause a significant performance degradation.

Solutions to these difficulties have been proposed in which a file control program at the file system level includes a command to pre-erase destination sectors containing original, to-be-revised, data so that the new or revised data is written onto the sector in a two-pass write-verify process. But such a method only reduces the delays; it does nothing to enhance data integrity. Another proposed solution would pre-erase sectors containing obsolete data (but not the sectors containing the original data), write the new or revised data to the erased sectors and then erase the original data. While this method may reduce the risk of data loss, it does nothing to reduce the delays and requires complicated directory maintenance to keep track of multiple versions of data on the same disk. Moreover, solutions of both types can entail substantial development costs, may not fit naturally or transparently into the intended operating system, may not be portable to other environments with different file system semantics and may only protect file data ("user" data) but not system control data.

SUMMARY OF THE INVENTION

It is, therefore, an object of the present invention to provide an apparatus and method for reducing both the data integrity exposure and the negative performance impact of separate erase and write passes when writing data to a rewritable optical disk.

It is another object to provide such an apparatus and method which do not require large development costs, which are substantially transparent to the host operating system, which can be portable to different operating environments and which will protect system control data as well as user data.

In accordance with the present invention, a system is provided for recording information on a rewritable optical disk. The system includes means for establishing a driver partition in a non-volatile storage buffer, means for receiving from a file system a block of file system data to be recorded in a predetermined target sector of a logical partition of a rewritable optical disk, means for storing the block of data in the first portion of the driver partition, means for storing in a second portion of the driver partition information identifying the target sector and means for background processing of the block of data. The background processing means includes means for erasing the target sector and for copying the block of data from the first portion of the driver partition to the erased target sector.

The non-volatile storage buffer can be located on the optical disk itself or can be on a separate device, such as non-volatile random access memory or magnetic media. Moreover, the system can be incorporated into an automated optical storage and retrieval (library) unit comprising one or more optical drives, numerous disk storage cells and a mechanical accessor for automatically mounting disk cartridges from the storage cells into the drives and replacing them. When a library unit is employed, the nonvolatile storage buffer can be located on a dedicated optical disk different from the disk on which is located the logical partition with the target sector.

The driver partition is established and maintained by driver software at a level below the file system. It is transparent to the user and data transfers from the driver partition to target sectors occur in the background during otherwise "dead" time for the drive. The present invention resolves the integrity/speed tradeoff, eliminating data exposure between the erase and write passes while enhancing performance by eliminating the erase pass immediately before a write. Because the present invention operates at the driver level, rather than the file system level, it is flexible and portable, not dependent upon any particular operating environment or application.

The foregoing and other features and advantages of the invention will be apparent from the following more particular description of preferred embodiments of the invention, as illustrated in the accompanying drawings.

BRIEF DESCRIPTION OF THE DRAWINGS

FIG. 2A is a flow chart of initializing the system of the present invention;

FIG. 2B is a flow chart of receiving a block of data from the host system and storing it of the present invention;

FIG. 3 is a flow chart of unmounting the optical disk system of the present invention;

FIG. 4A is a flow chart of performing background processing of the present invention;

FIG. 4B is a flow chart of the system receiving and processing a read block request of the present invention;

FIG. 4C is a flow chart of packing multiple blocks of write data of the present invention; and FIG. 5 is a block diagram of the present invention employed in an automated storage library environment.

DETAILED DESCRIPTION OF THE INVENTION

Figure 1:
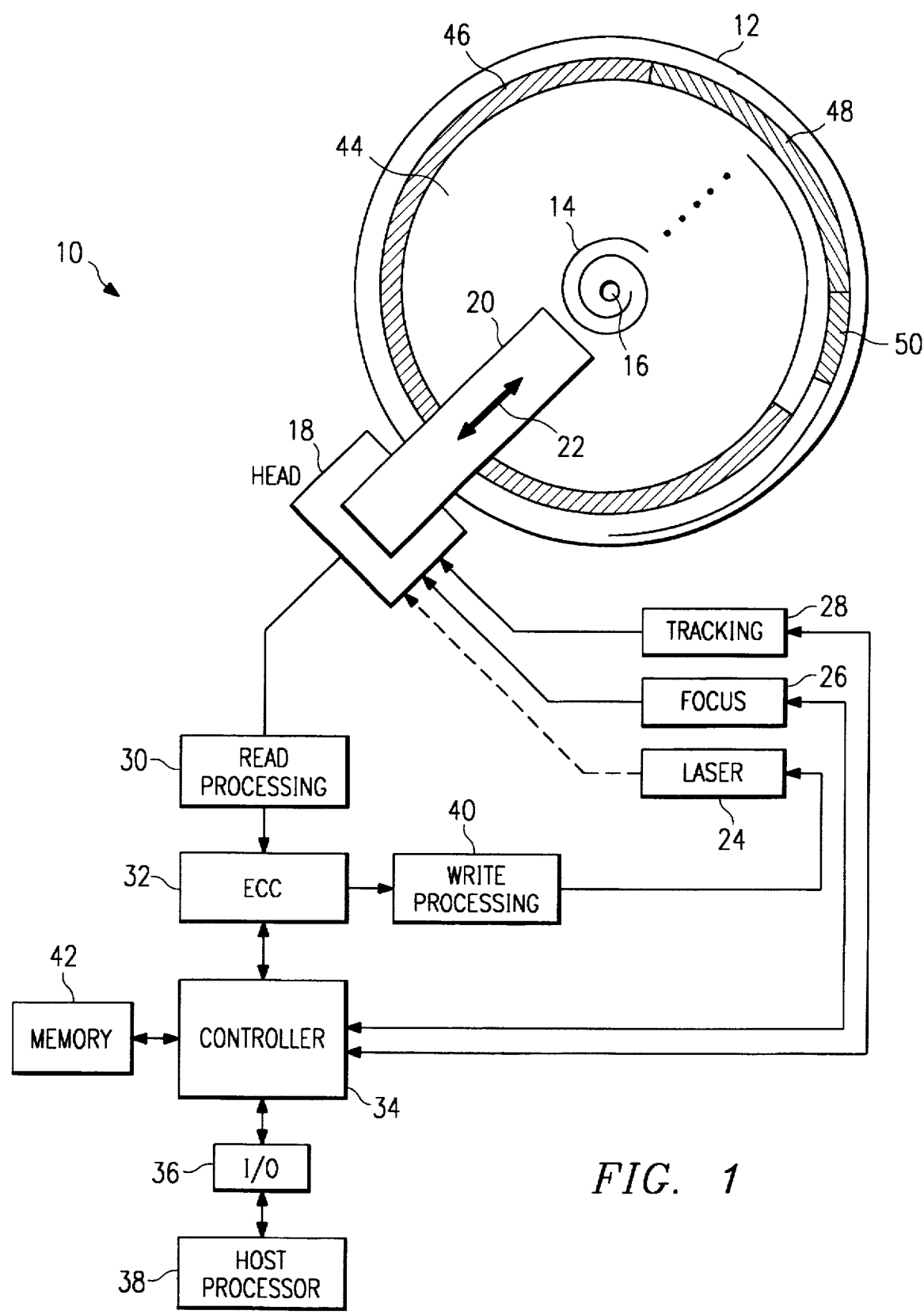
FIG. 1 is a block diagram of the recording system of the present invention and includes a representation of a rewritable optical disk.

FIG. 1 is a block diagram of the recording system 10 of the present invention and includes a representation of a rewritable optical disk 12. The present invention will be described with reference to a magneto-optical (MO) disk but it is equally applicable to other rewritable optical media, such as phase change disks. The disk 12 includes a continuous spiral track 14 (although it is also known to use concentric circular tracks) around a central hub 16. Not shown are a spindle onto which the disk 12 can be mounted or a spindle motor for rotating the disk 12. The disk 12 can be permanently mounted on the spindle in a disk drive or can be removably mounted in the drive. An optical read/write head 18 includes a head arm 20 proximate to one surface of the disk 12 and transporting various optical elements radially relative to the hub 16 (that is, in the directions indicated by the arrow 22).

The head 18 includes an optical path coupled to a laser 24 which provides a laser beam for reading or erasing data from, and writing data to, the disk 12. Focus and tracking units 26 and 28, respectively, control coarse and fine actuators in the head 18 to enable the laser beam to access and precisely follow a desired portion of the track 14. Data read from the disk 12 is processed by a read processor 30 and an error correction code (ECC) processor 32 before being transmitted to a drive controller or processor 34. The controller 34, in turn, sends the data through an interface device 36 to a host processor 38, such as a control unit, personal computer, large system computer, communications system or the like. Reversing the foregoing process to write data, data is transmitted by the host 38 through the interface 36 to the controller 34. The controller 34 sends the data through the ECC processor 32 to be processed by a write processor 40 before being written to the disk 12. The laser 24 and focus and tracking units 26 and 28 are also interconnected with, and controlled by, the controller 34 which can include a memory 42 for holding control programs and data.

File system data (user data as well as control data) are read, processed, written and transmitted in logical blocks, each corresponding in size (in bytes) to a physical sector of the disk 12. Information associated with each data block indicates the destination address (the target sector) of the data block in a logical partition 44 of the disk 12. File system software, such as executed on the host 38, organizes the data and establishes the correct destination addresses.

As used herein, the term "file system data" also includes data base systems and the term "files system software" includes software which the operating system utilizes to store data onto a secondary storage device.

The present invention includes driver level software (hereinafter referred to as the "driver") operating below and independent of the file system software to establish a driver partition, separate from the logical partition 44, for temporarily maintaining blocks of data destined for the logical partition 44. The driver can reside, for example, in a an operating system (such as Unix or OS/2) device driver, in microcode in the optical drive itself, in the logical volume manager in AIX, split between a hardware driver and the logical volume manager, or in software in an automated optical library controller. The driver partition is established on any non-volatile device, including the same optical disk 12 on which the logical partition 44 is located, a separate optical disk, magnetic media or non-volatile random access memory. Thus, if a power failure or other system fault occurs, the data stored in the driver partition will remain intact and can be recovered later when the system returns to normal.

The driver partition comprises space for data blocks and control information. It is believed that a partition size of about ten percent of the size of the logical partition which its serves provides efficient operation; however, the actual size is not critical. Although the driver partition will be described as residing on the same media as the logical partition, the description is equally applicable to driver partitions established on other non-volatile devices.

Three structures are maintained by the driver in the driver partition (the shaded portions of the disk 12 shown in FIG. 1). A pending write entry (PWE) area 46 comprises the bulk of the driver partition and includes pre-erased space to store blocks of data from the host 38. A separate PWE is created for each block and includes header information, specifying the size and target address of the data, and the data itself. The PWE's are stored sequentially in entry areas in the PWE area 46; a later stored block destined for the same target sector as an earlier stored block supersedes the earlier stored data. This ensures that only the most recent data in the PWE area 46 is valid and is eventually copied to the logical partition 44. Moreover, when the host 38 issues a command to read data from the disk 12, the driver can re-direct the command and determine whether the desired data is in the PWE area 46. If it is, the most current version of the desired data is read and transmitted to the host 38 while earlier, invalid (obsolete) versions are ignored. If the desired data is not in the PWE area 46, it is read directly from the logical partition. Thus, the driver partition has cache-like characteristics.

The second structure in the driver partition is a map 48 which includes an entry for each PWE in the PWE area 46 indicating the size of the PWE, its location in the PWE area 46 and its target sector in the logical partition 44. A control block structure 50 is also maintained in the driver partition to determine the status of the map 48 and the location of the next available erased entry area in the PWE area 46. The map status is indicated by a "valid" flag having a TRUE state to indicate that the information in the map 48 is up to date and a FALSE state to indicate that the information has been corrupted or is otherwise obsolete. It will be appreciated that the sizes and locations of the logical partition 44, the PWE area 46, the map 48 and the control block 50 shown in FIG. 1 on the disk 12 are for illustrative purposes only and are not intended to represent their actual sizes or locations.

The operation of the present invention will now be described with reference to the flowcharts of FIGS. 2–5. The optical disk 12 is mounted in a drive (Step 200, FIG. 2A), the driver reads the control block structure 50 from the driver partition (Step 202) and checks the status of the valid flag (Step 204). If the flag is set to TRUE, the map structure 48 in the driver partition is valid (current) and can be read from the driver partition into a memory device, such as the memory 42 (FIG. 1) or, to prevent loss of mapping information, to a non-volatile random access memory. The flag is set to FALSE (Step 206) indicating that the map in the driver partition is no longer current but has been superseded by the in-memory map which will be kept current during subsequent operations, and the map structure written to the memory (Step 208). If the flag is FALSE when originally checked (Step 204), the map structure 48 is deemed to be faulty; the PWE headers must be read by the driver (Step 210) until an erased entry area is located (Step 212), thereby rebuilding the map 48 (Step 214). This updated map is then written to the in-memory map (Step 208).

Once the system is ready (Step 216), the system receives a block of file system data from the host (Step 218, FIG. 2B) and determines whether the system is in a stream mode (Step 220). The stream mode is enabled when the logical partition 44 is to be stream filled (that is, when large amounts of data destined for consecutive target sectors or tracks are to be written in a single write operation) or when the amount of data to be written could exceed the capacity of the driver partition. If the stream mode is enabled, the appropriate sectors in the logical partition 44 are erased, if necessary, and the data stream written directly to them by the drive (Step 222). A verify pass typically follows the write pass.

If the stream mode is not enabled, the system generates a corresponding PWE (Step 224) which is written to the next available entry area in the driver partition (Step 226). The in-memory map is then updated (Step 228) with information about the new PWE.

Periodically, such as through polling or interrupts, the system determines whether the user has requested that the disk 12 be unmounted (Step 300, FIG. 3). The "user" can be a human computer operator in an automated environment or can be a library controller in a library environment (as will be described more fully below in conjunction with FIG. 5). In either case, before the disk 12 is unmounted, the in-memory map must be written to the map structure 48 of the driver partition (Step 302). The valid flag is then set to TRUE (Step 304) and written to the control block 50; the disk is then ejected from the drive (Step 306) and the operation is completed.

Keeping unused entry areas in the PWE area 46 erased in anticipation of later write operations reduces the total seek and latency delays by eliminating the erase pass during a write and frees the host 38 more quickly for other tasks. Further increases in speed and efficiency are achieved in the present invention with background processing of the PWE's (Steps 400 and 402, FIG. 4A), transparently without requiring user or host intervention and without delaying or otherwise affecting host operations. Three modes of background processing are discussed herein as examples; other background modes can also be employed. For concurrent background operations, after receiving a read-block request from the host (Step 404, FIG. 4B), the system determines whether the data requested is in the driver partition (Step 406). If so, the data is returned to the host from the most recent PWE (Step 408) and the operation is completed. If the data is not in the driver partition, the system determines whether a "piggy-back" mode is enabled (Step 410). Such a mode permits piggy-backing erase and write operations involving PWE's onto sector seek operations during host initiated data read, write, erase and verify operations. If the driver determines that a seek has been initiated by the host 38, the in-memory map is checked to determine whether any PWE in the driver partition is destined for a sector located "near" the seek-to sector (that is, the sector to be erased, read from, written to or verified) (Step 412). "Near" can be a defined distance based upon the seek performance characteristics of the drive. The optimal value can be determined experimentally for a given environment and can be, for example, plus or minus about thirty tracks. If a target sector is near the seek-to sector, the driver determines whether the target sector contains obsolete data and needs to be erased (Step 414). If so, the erasure is accomplished while the optical head 18 seeks to the near sector (Step 416) and copying the PWE to the target sector occurs later. If the target was previously erased, the PWE is copied from the driver partition to the target sector after the optical head 18 seeks to the near sector (Step 418) and the in-memory map updated (Step 240). If the piggy-back mode is not on, the system seeks to, and returns, the requested data (Steps 422 and 424) when the drive is available.

"Packing" can also be accommodated in the background when write operations of multiple blocks of data will affect contiguous sectors. If packing is enabled (Step 430, FIG. 4C), the in-memory map is checked for PWE's destined for contiguous target sectors in the logical partition 44 (Step 432). If there are none, the target sector partition is erased (Step 434) and the PWE is copied from the driver partition to the logical partition (Step 436). If there are PWE's destined for contiguous target sectors, the contiguous target sectors are erased from the logical partition 44 (Step 438) and the PWE's copied from the driver partition to the logical partition 44 (Step 440).

After the PWE's have been copied (Steps 436 or 440), a determination is made whether additional PWE's remain to be processed (Step 442). If so, and if the drive is inactive (Step 444), the packed-mode PWE processing is repeated (beginning with Step 432). If no further PWE's remain to be processed, or if the drive is active, the in-memory map is updated and the moved PWE's are erased (Step 448).

If the packed mode is not enabled, a target sector of a PWE in the driver partition is erased (Step 450) and the PWE copied to the erased sector (Step 454). The in-memory map is updated to indicate that PWE's have been successfully copied to the logical partition 44 of the disk 12. And, after a PWE has been copied to the logical partition 44, it can be erased (Step 456) from the driver partition to provide space for a future PWE; the control block 50 is then updated to reflect the availability of the newly erased entry area. This step can be performed after updating the in-memory map or whenever the disk is otherwise inactive. Moreover, when the PWE area 46 becomes full, obsolete PWE's should be erased to free space in the driver partition or blocks of data from the host 38 will have to be written directly to the logical partition 44 of the disk 12 in a conventional three-pass erase-write-verify process.

Following the erasure of obsolete PWE's (Step 456), additional blocks of data can be received (Step 458) and the just described process repeats when the drive is inactive (Step 460).

The present invention can be employed in either a stand-alone (non-automated) environment or can be incorporated into an automated storage and retrieval library 500 as shown in FIG. 5. The library 500 includes a library controller 602 interconnected with a host processor 504. One or more optical disk drives 506 and an autochanger or a mechanical accessor 508 are also interconnected with the controller 502 Such interconnection can be made with a single bus, such as a SCSI bus, or with separate buses for the drives 506 and the accessor 508. When information on a particular optical disk (typically encased in a protective housing or cartridge) is desired to be accessed, the controller 502 directs the accessor 508 to locate and retrieve the cartridge from its storage cell in a bank of cells 510 and mount the cartridge in one of the drives 506. When the cartridge is no longer needed, the accessor 508 is directed to replace it in the original or another cell 510. As with the non-automated environment, the driver partition in the library 500 can be located on the same optical disk as the logical partition, in non-volatile random access memory (such as in the library controller 502) or on separate magnetic media. In addition, however, the driver partition can be located on a dedicated optical disk in the library 500, preferably kept mounted in one of the disk drives 506 and used to maintain PWE's for many disks. Appropriate microcode or software instructions ensure that PWE's are copied to the correct sectors of the correct disks.

While the invention has been particularly shown and described with reference to preferred embodiments thereof, it will be understood by those skilled in the art that various changes in form and details may be made therein without departing from the spirit and scope of the invention.

What is claimed is:

1. A machine-executed method for executing a driver level program of instructions for recording information on a rewritable optical disk mountable in a disk drive interconnected with a host device, the host device executing file system software which processes logical blocks of file system data to be read from and written to sectors in a logical partition of the optical disk, comprising the steps:

establishing a driver partition in a nonvolatile storage buffer to be managed by the driver level program independent of the file system program, the driver partition having a pending write entry area and a map area;

reading any data from the map area into an in-memory map;

receiving a first block of file system data to be recorded in a first target sector of the logical partition of the optical disk;

storing the first block of data in a first pending write entry in the pending write entry area of the driver partition;

updating the in-memory map with the location of the first block of data and the predetermined target sector;

notifying the file system software that the first block of data was stored;

processing the first block of data in a background mode, including erasing the target sector and copying the first block of data from the first pending write entry to the first target sector;

erasing the first block of data from the first pending write entry; and copying the updated in-memory map to the map area of the driver partition.

2. The method of claim 1, wherein said step of processing in a background mode comprises the step of erasing the first target sector and copying the first block of data while the disk drive is otherwise inactive.

3. The method of claim 1, wherein said step of storing the first block of data comprises the step of storing a plurality of blocks of file system data in a plurality of pending write entries within the pending write entry area.

4. The method of claim 3, further comprising the step of storing a control block in a control block area of the driver partition to indicate an available pending write entry in the pending write entry area of the driver partition.

5. The method of claim 4, further comprising the steps of, before reading the mapping information from the map area:

reading a flag in the control block area upon mounting the optical disk in the disk drive, the flag having a TRUE state and a FALSE state;

if the state of the flag is TRUE when read from the control block, setting the state of the flag to FALSE; and if the state of the flag is FALSE when read from the control block:

reading a header from each pending write entry;

finding an available pending erased entry in the pending write entry area; and rebuilding the mapping information in the map area.

6. A system for recording information on a rewritable optical disk, comprising:

a disk drive, interconnected with a host device on which a file system program is executable to process logical blocks of file system data, for recording blocks of the file system data onto target sectors in a logical partition of a rewritable optical disk mounted in said disk drive; and a memory for storing machine-executed driver level instructions for:

establishing a non-volatile driver partition to be managed by the driver level instructions independent of the file system program, the driver partition having a pending write entry area and a map area;

reading any data from the map area into an in-memory map;

receiving a first block of file system data to be recorded in a first target sector of the logical partition of the optical disk;

storing the first block of file system data in a first pending entry of the pending write entry area;

updating the in-memory map with the locations of the first block of file system data and the first target sector;

notifying the file system program that the first block of file system data was stored;

processing the stored first block of file system data in a background mode, including erasing the first target sector and copying the first block of file system data from the first pending write entry to the first target sector;

erasing the first block of file system data from the first pending write entry; and copying the updated in-memory map to the map area of the driver partition.

7. The system of claim 6, wherein said non-volatile driver partition is located on the optical disk.

8. The system of claim 6, wherein said non-volatile driver partition comprises non-volatile random access memory.

9. An optical library system, comprising:

a library controller interconnected with a host device executing file system software which processes logical blocks of file system data;

a plurality of cells for storing a plurality of rewritable optical disks;

at least one optical disk drive interconnected with said library controller for recording the logical blocks of file system data onto target sectors in a logical partition of a selected rewritable optical disk mounted in the drive;

a mechanical accessor for transferring the selected optical disk between said one of said plurality of cells and said at least one drive;

a non-volatile storage buffer; and a machine-executed driver program with instructions for:

establishing a driver partition in the non-volatile storage buffer to be managed by the driver level program independent of the file system program, the driver partition having a pending write entry area and a map area;

reading any data from the map area into an in-memory map;

receiving a first block of file system data to be recorded in a first of said target sectors of the logical partition of the selected optical disk;

storing the first block of data in a first pending write entry in the pending write entry area of the driver partition;

updating the in-memory map with the location of the first block of data and the first target sector;

notifying the file system software that the first block of data was stored;

processing the stored first block of data in a background mode, including erasing the first target sector and copying the Stored first block of data from the first pending write entry to the first target sector;

erasing the first block of data from the first pending write entry; and copying the updated in-memorymap to the map area of the driver partition.

10. The system of claim 9, wherein said non-volatile storage buffer comprises a dedicated one of the plurality of optical disks.

11. The optical library system of claim 9, wherein said non-volatile storage buffer is located on each of the plurality of optical disks.

12. The system of claim 9, wherein said non-volatile storage buffer comprises non-volatile random access memory.

* * * * *

UNITED STATES PATENT AND TRADEMARK OFFICE
CERTIFICATE OF CORRECTION

PATENT NO. : 5,537,578
DATED : July 16, 1996
INVENTOR(S) : K. F. Day, III; D. W. Dewey; M. A. Truty It is certified that error appears in the above-indentified patent and that said Letters Patent is hereby corrected as shown below:

Title page, item [54] and column 1, line 1:

In the title:
    Change "Driving" to --Driver--.

Signed and Sealed this

Fifth Day of November, 1996

Attest:

BRUCE LEHMAN

Attesting Officer    Commissioner of Patents and Trademarks